March 31, 1964 S. D. BLITZER ET AL 3,126,746
LINEAR ACCELEROMETER, PICK-OFF MECHANISM AND
VARIABLE DAMPING MECHANISM COMBINATION
Filed June 26, 1961 4 Sheets-Sheet 1

Fig.1

STANFORD D. BLITZER
DANTE V. CONSALVO
INVENTORS

BY
ATTORNEYS

INVENTORS
STANFORD D. BLITZER
DANTE V. CONSALVO

March 31, 1964  S. D. BLITZER ET AL  3,126,746
LINEAR ACCELEROMETER, PICK-OFF MECHANISM AND
VARIABLE DAMPING MECHANISM COMBINATION
Filed June 26, 1961  4 Sheets-Sheet 4

STANFOR D. BLITZER
DANTE V. CONSALVO
INVENTORS

BY

ATTORNEYS

United States Patent Office 3,126,746
Patented Mar. 31, 1964

3,126,746
LINEAR ACCELEROMETER, PICK-OFF MECHANISM AND VARIABLE DAMPING MECHANISM COMBINATION
Stanford D. Blitzer, Newton Lower Falls, and Dante V. Consalvo, 37 Pearl St., Everett, Mass.; said Blitzer assignor to General Precision Inc., Little Falls, N.J., a corporation of Delaware
Filed June 26, 1961, Ser. No. 130,707
9 Claims. (Cl. 73—497)

This invention relates to improvements in linear accelerometers having a displaceable inertia mass and more particularly to low cost accelerometers of small size and light weight for use in aircraft, missiles, and the like.

This invention applies specifically to Linear Accelerometers, which are primarily instruments for determining instantaneous accelerations by measuring the linear displacement of a proof mass, relative to a fixed housing, the linear displacement producing an electrical signal output, which is proportional to the instantaneous acceleration along a sensitive axis.

One feature of the invention is directed to an improved means for supporting the proof mass in an accelerometer.

The device also includes a housing which is so constructed as to reduce to a minimum the effects of variation in temperature, thus enabling the accelerometer to operate over a wide range of temperatures.

This invention is particularly concerned with providing a relatively low cost acceleration detecting instrument of small size and light weight, yet possessing a high degree of sensitivity and accuracy.

Another feature of the invention is that it includes a pick-off mechanism which enables the device to indicate the degree to which the proof mass is longitudinally displaced.

It is accordingly an object of the invention to provide a compact and light weight accelerometer having an improved spring suspension system for the inertia mass.

Another object is to incorporate with the accelerometer a magnetically operated variable damping device which protects the accelerometer against severe shock and vibration and provides linear damping of the proof mass, which is proportional to the velocity.

A major feature of the accelerometer is that it includes a magnetic damping device, with means incorporated therewith for controlling the magnetic characteristics of the damping device, while the damping device is sealed.

A further object is to provide an improved means for compensating for the operating characteristics of the accelerometer due to temperature variations.

Still another object of the invention is to provide such an accelerometer wherein all of the functioning parts are concentrically mounted to reduce the size and weight of the accelerometer while providing improved rigidity and without sacrificing the sensitivity and accuracy thereof.

Still another object of the invention is to provide a suspension system, in which all components linking the stator with the armature of the pick-off mechanism are subjected only to shear forces when the proof mass is accelerated along the sensitive axis of the accelerometer.

It will be understood that the following description of the construction and the method of attachment, wiring, operation and utilization of the Linear Accelerometer, fitted with pick-off and damping mechanism is intended as explanatory of the invention and not restrictive thereof.

In the drawings, the same reference numerals designate the same parts throughout the various views, except where otherwise indicated.

Figure 1:
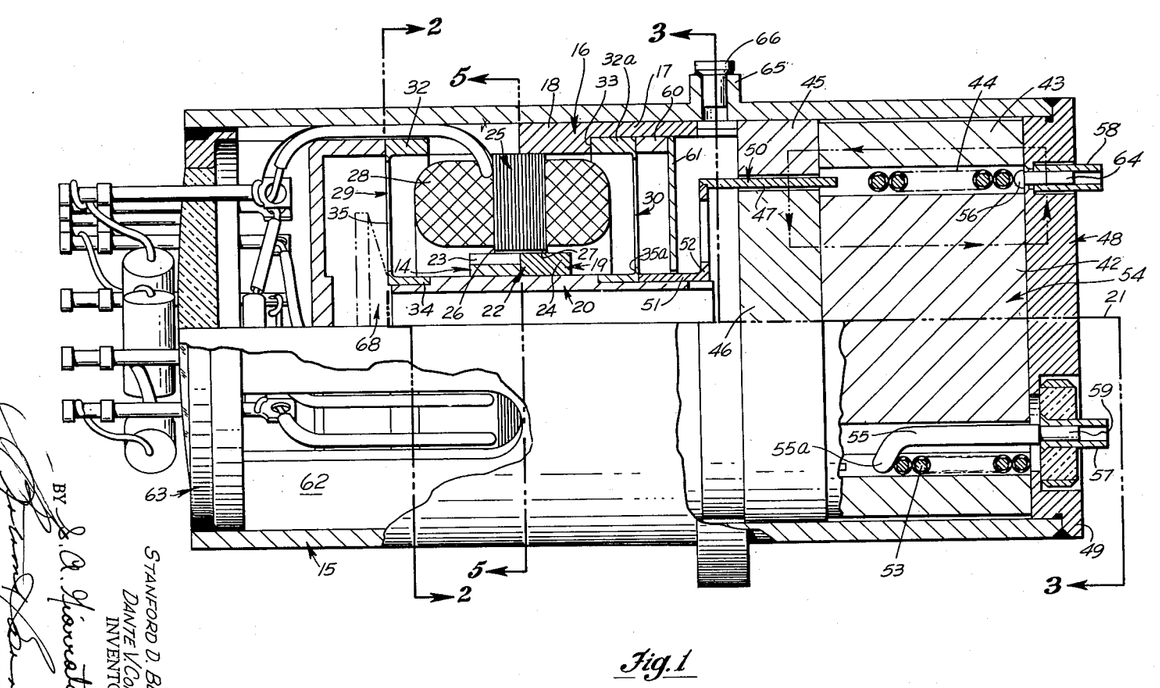
FIGURE 1 is a longitudinal section through the accelerometer combination, including the accelerometer proper, the combination torquing and pick-off mechanism, and the magnetically controlled variable damping mechanism, the section being taken on the line 1—1, FIGURE 2.
Figure 2:
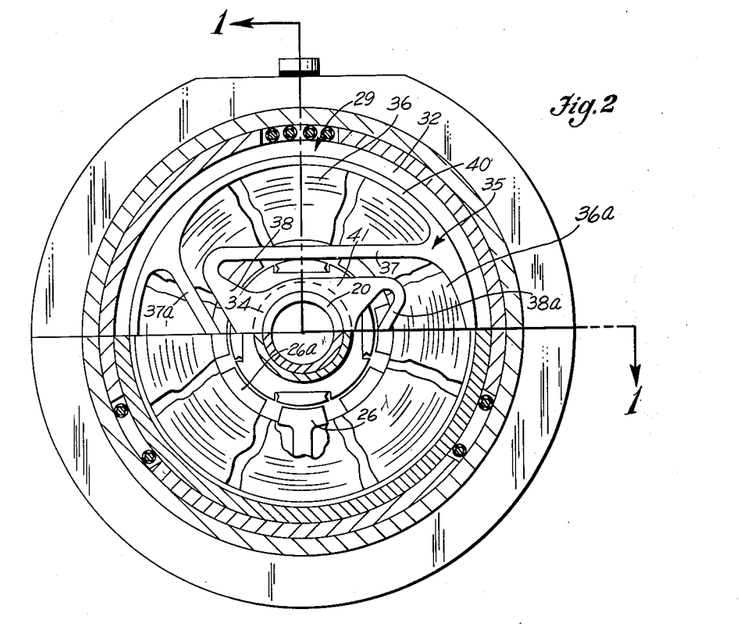
FIGURE 2 is a cross-section through the accelerometer, shown in FIGURE 1, showing one of the flexure plate springs, the section being taken on the line 2—2, FIGURE 1.
Figure 3:
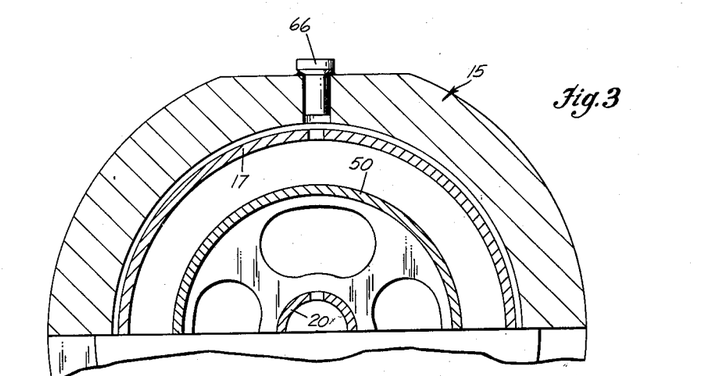
FIGURE 3 is a partial cross-section through another portion of the accelerometer combination, shown in FIGURE 1, showing a portion of the variable damping mechanism, the section being taken on the line 3—3, FIGURE 1.

One embodiment of the accelerometer, shown in FIGURES 1, 2 and 3 comprises a hollow tubular outer housing 15, having a tubular inner housing 16, fitted to the inner circumference thereof.

The inner tubular housing includes two thin-walled tubular end sections 17 and a heavier walled reduced inner diameter tubular central section 18, integral with the end sections.

While FIG. 1 of the drawings shows the stator as mounted in the inner housing (16), the inner housing may be eliminated entirely, the entire stator and the other parts of the unit being mounted in the interior of the outer housing (15).

A proof mass, in the form of a central tube 20, mounted on the sensitive axis 21, plus all parts directly supported by the central tube 20, of the accelerometer, is fitted to the interior of the tubular inner housing 16.

Figures 5, 6, 7, 10:
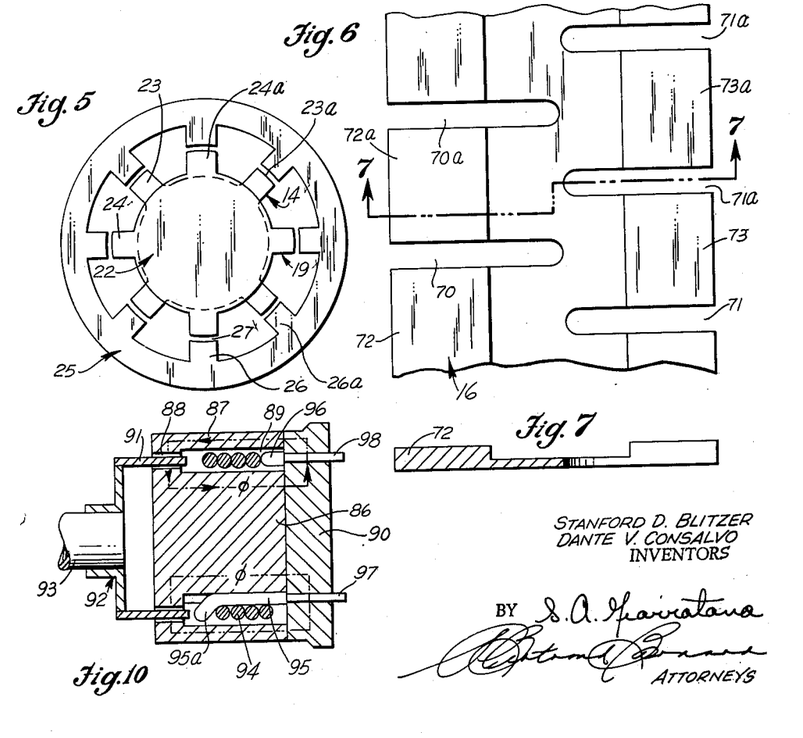
FIGURE 5 is a schematic cross-section through the combination pick-off and torquing mechanism, shown in FIGURE 1, taken on the line 5—5, FIGURE 1.
FIGURE 6 is a schematic developed plan view of the outer circumference of the inner housing of the modified accelerometer shown in FIGURE 4.
FIGURE 7 is a section through the wall of the inner housing shown in FIGURES 4 and 6, the section being taken on the line 7—7, FIGURE 6.
FIGURE 10 is a schematic longitudinal section, similar to a portion of FIGURE 1, through a modification of the magnetic damping mechanism shown in FIGURE 1.

The circumferential inner surface of a tubular armature 22 which is formed in two axially aligned sections, each of which has a set of radially positioned poles 23, 23a, 24, 24a, integral therewith as shown in FIG. 5 is fixedly attached to the outer circumference of the central tube 20. Thus the two sections of the armature are bonded in shear to the central tube.

The circumferential outer surface of a stator core ring 25, which has a plurality of equally spaced inwardly extending radial poles 26, 26a, fixedly attached thereto, or integral therewith, is fixedly attached to the inner circumference of the central section 18, of the inner housing.

Thus the stator is bonded in shear to the inner housing, or the outer housing, where the inner housing is eliminated. As shown in FIGURE 5, the number of poles 26, 26a in the stator is equal to the total number of poles in the two sets of poles 23, 23a, 24, 24a integral with the sections of the armature, which is a multiple of four, a small annular air gap 27, being formed between the inner diameter of the poles of the stator, and the outer circumference of the poles 23, 23a, 24, 24a of the armature 22.

The armature 22 is formed in two sections or halves 14, 19, located in axial alignment with one another, the plane separating the two sections being in substantial alignment with the center plane of the poles 26, 26a of the stator in the neutral position, shown in FIGURE 1.

As shown in FIGURE 5, the poles 23, 23a of one section 14, of the armature 22, or armature half, are angularly off set relative to the poles 24, 24a of the second section thereof, the poles 23, 23a being located midway between the poles 24, 24a.

When the central tube 20 of the accelerometer is moved longitudinally from its neutral position shown in FIGURE 1, the linear deflection of the two flexure springs 29, 30, causes the central tube 20 to be rotationally moved through a small angle, as the circumferential outer surfaces of the outer ring sections 32, 32a of the flexure springs 29, 30 are fixedly attached to the inner housing.

In order to compensate for this rotational angular movement, the poles 23, 24 of the sections of the armature 22 are made wider than the poles 26, 26a of the core of the stator. This assures positive and uniform areas through the two sets of poles 23, 24, 26, regardless of the rotational angular deflection of this central tube 20.

Figure 4:
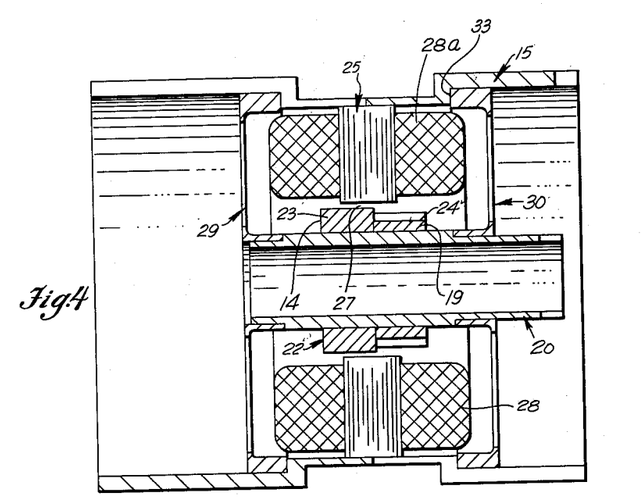
FIGURE 4 is a longitudinal schematic section through a modification of the accelerometer, shown in FIGURE 1, showing the inner case and the plate springs supporting the proof mass.
Figures 8, 9, 12:
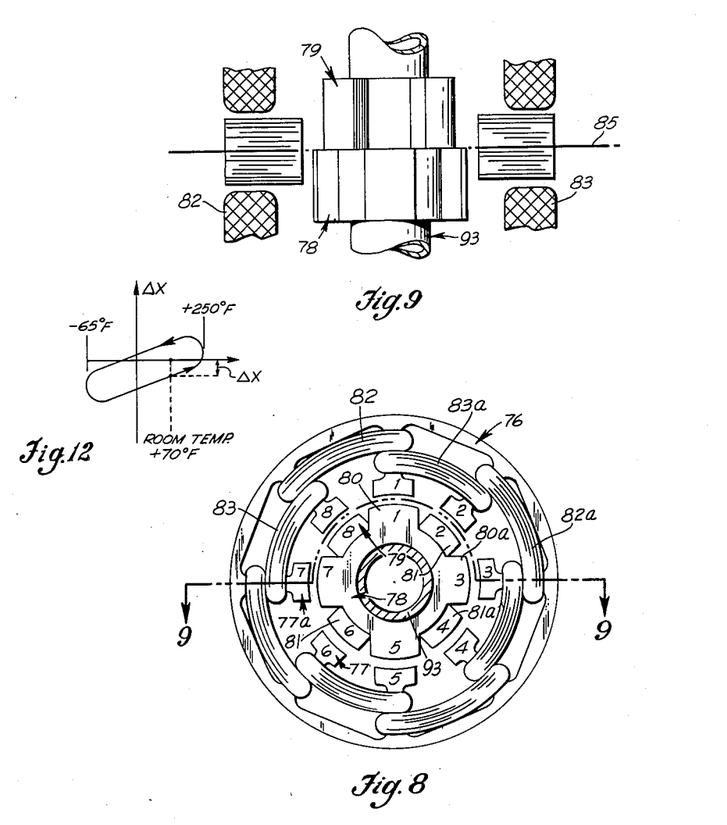
FIGURE 8 is a schematic front elevational view of a modification of the pick-off mechanism shown in FIGURES 1 and 5.
FIGURE 9 is a schematic longitudinal section through the modified pick-off mechanism shown in FIGURE 1, showing the armature and the stator poles used in conjunction therewith, the section being taken on the line 9—9, FIGURE 8.
FIGURE 12 is a schematic curve showing the stability of axial movement of the proof mass under control of the environmental temperature.

As shown in FIGURE 4, and clarified in the construction shown in FIGURE 8, multiple pairs of stator coils 28, 28a are fitted to the interior of the inner housing 16, the stator coils straddling opposite sides of the poles of the stator core 25.

The stator coils include primary and secondary coils, as hereinafter described in greater detail.

The central tube 20 is supported by a pair of flexure plate springs 29, 30, each of which includes a tubular outer ring section 32, the circumferential outer surface of which is pressed into or otherwise inserted into the inner diameter of one of the end sections of the inner housing, a shoulder 33 formed at the inner end of each end section laterally positioning the flexure spring 29, 30 and a tubular inner ring section 34, the circumferential inner surface of which is pressed or otherwise fixedly attached to one reduced diameter end of the central tube 20. Thus the outer ring of each flexure spring is bonded in shear to the inner housing, and the inner ring of each spring bonded in shear to the central tube 20.

The reference to "bonded in shear" indicates that accelerating forces along the sensitive axis produce shear forces only at the bonded surfaces between the housing and the stator and the housing and the outer ring of the springs.

A thin central section or diaphragm 35, which is integral with each flexure spring 29, 30 forms the flexural portion of each flexure spring 29, 30 the central section having a plurality of arcuate cutouts 36, 36a therethrough to form a plurality of arms 37, 37a, supporting the tubular inner ring section 34 of each flexure spring, from the tubular outer ring section 32 thereof.

The arms 37, 37a of the spring diaphragm may be either relatively straight, with short bent ends 38, 38a as shown in FIGURE 2, or of arcuate contour, each arm extending from the outer rim portion 40 of the flexure spring, which is integral with the tubular outer ring 32 to an inner hub section 41, which is integral with the tubular inner ring 34, thereby providing a positive connection, and a high degree of flexibility between the tubular outer ring 32 and the tubular inner ring 34 of each flexure spring 29, 30. The flexure springs 29, 30 provide a restraining force, which is proportional to the longitudinal displacement of the central tube 20, or proof mass.

The right-hand end of FIGURE 1 shows a magnetic damping mechanism, which is used in conjunction with the accelerometer shown in FIGURE 1. The damping mechanism includes a permanent magnet formed in two sections 42, 43, including an outer ring 43 which is fitted to the interior of the outer housing, and an inner cylindrical section 42, an annular air gap 44 being formed between the two sections of the permanent magnet.

The two permanent magnet sections are attached to individual sections of a multi-section return path, the sections of which are attached to one end of the two sections of the permanent magnet respectively. The outer section of the return path consists of a tubular ring 45, which is inserted in the interior of the outer housing 15, and a solid cylindrical central section 46, which is attached to the cylindrical section 42 of the permanent magnet by cementing, or other suitable attaching means. An annular air gap 47, is formed between the two sections of the return path.

The two sections 42, 43 of the permanent magnet, the two sections 45, 46 of the return path 44, and a return path cap 48 fitted to the open outer end of the housing in a manner hereinafter described, form a fixedly assembled unit 54, which is inserted through the open end of the outer housing into the position shown in FIGURE 1.

Thus the left-hand edge of the tubular outer ring 45 of the return path is cemented or otherwise attached to the tubular outer section 43 of the permanent magnet. Similarly the right-hand face of the tubular outer section 43 of the permanent magnet, and the corresponding face of the cylindrical inner section of the permanent magnet are cemented, or otherwise attached to the inner face of the cap 48, or return path, which is later attached to the open end of the housing.

In that manner, the entire assembly including the coil 53, which is inserted into the air-gap 44 between the permanent magnet sections, is assembled as a unit, and inserted into the open end of the outer housing 15 as a unit, by gripping the end cap 48 or return path.

An end cap or soft iron return path 48, is inserted in the open right-hand end of the outer housing, a flange 49, integral with the outer end of the end cap being soldered, brazed or otherwise fixedly attached to the outer end of the outer housing. The end cap or return path 48 serves as a path for the magnetic lines of force of the permanent magnet sections 42, 43.

The end cap 48, or return path 4 is inserted into the position shown in FIGURE 1, after it is attached to the two sections 42, 43 of the permanent magnet, and the magnet sections are attached to the return path sections 45, 46 in the manner hereinbefore described.

A tubular copper ring 50 is inserted into the annular air gap 47, between the inner and outer sections of the return path, the open end of the copper ring 50 extending into the air gap 44, between the two sections 42, 43 of the permanent magnet. The copper ring 50 is supported by an aluminum or other type of plate bracket.

The plate bracket consists of tubular inner ring 51 which is fitted to a reduced diameter section of the central tube or proof mass 20, adjacent the inner ring of one of the flexure springs, and a circular plate section 52 integral with the inner ring, the circular plate section being brazed or otherwise fixedly attached to the copper ring.

As the copper ring 50 is moved into and out of the air gap between the two return path sections 45, 46, by the longitudinal movement of the central tube 20, caused by the linear acceleration movement of the outer housing 15, the copper ring 50 cuts through the magnetic line of force in the air gaps 47 and 44, between the two sections 45, 46 of the return path and the two sections 42, 43 of the permanent magnet, respectively, thereby damping the longitudinal movement of the copper ring 50 and the central tube 20 to which it is attached.

In order to control the magnetic lines of force in the permanent magnet, a coil 53 is inserted in the air gap 44 between the two permanent magnet sections 42, 43.

The coil 53 is connected to outside connections beyond the cap or return path 48 by a pair of leads 55, 56, one of which 55, extends through an area, located inside the air gap 44, the inner end 55a of the lead is integral with the inner end of the coil 53. The wire or end 59 of the lead passes through a tubular ferrule 57, which is inserted in the return path cap 48 to an external voltage source. The insulator may be cylindrical glass insulator, as shown in FIGURE 1, or other suitable insulating means may be substituted therefor.

The second lead 56 engages the outer or right-hand end of the coil 53. The reduced diameter, outer end 64, of the second connector terminal 56, passes through a second tubular ferrule 58, inserted in the return path 48, to the voltage source. The ferrule 58 would be insulated from the return path cap by a glass or other type of insulator, such as that shown in FIGURE 1.

By controlling the flow of current through the coil 53 by means of the leads 55, 56, the permanent magnet sections 42, 43 are partially magnetized or demagnetized, depending upon the direction of the flow of the current through the coil 53. This controls the magnetic lines of force through the permanent magnet sections 42, 43 and therefore the damping action against the copper ring 50 and the central tube 20 or proof mass to which it is attached.

This enables the magnetic lines of force generated by the permanent magnet sections 42, 43, and therefore the damping action on the central tube 20, to be regulated after the entire unit is sealed. The coil 53 is only energized for initially establishing the level of the magnetic flux between two sections 45, 46 of the return path, in the annular air gap 47. At all other times the coil is inert.

The path of the magnetic lines of force through the sections of the permanent magnet, and the return path shown in FIGURE 1, is substantially as shown by dot-dash lines in FIGURE 1.

The magnetic lines of force pass from the outer permanent magnet ring 43, through the outer return path ring 45, thence radially to the central cylindrical return path member 46, thence longitudinally to the central cylindrical permanent magnet section 42, from which they pass through the cap or outer return path member 48, from which they are returned to the tubular magnetic ring 43. The magnetic flux lines between the two return path sections 45, 46 are radial across the annular air gap 47. The permanent magnet damping mechanism provides a restraining force, which is proportional to the velocity of the proof mass.

In order to prevent the flow of magnetic lines of force from the sections 45, 46 of the return path to the armature 22 of the pick-off mechanism, a magnetic shield is inserted between the outer flexure spring 30, and the inner edge of the copper ring 50.

The magnetic shield, which is made of high permeability magnetic material, such as Allegheny, Ludlum Steel Corporation's "Mu metal," consists of a tubular outer ring or spacer 60, which is located adjacent the outer ring 32a of the right-hand flexure spring 30, and a flat circular disc 61 attached to one edge of the outer ring 60, the inner diameter of the circular disc 61 clearing the tubular inner ring 51, of the plate bracket, supporting the copper ring 50.

In order to seal the interior of the outer housing 15, a seal cap 63, which also serves as a connector plate, is attached to the left-hand end of the outer housing, the seal cap being soldered, or otherwise fixedly attached to the open left-hand end of the outer housing 15.

The interior of the outer housing is filled with a gas 62, such as a mixture of helium and nitrogen. This gaseous mixture is introduced into the outer housing, through an opening through a boss 65, which is integral with the outer wall of the outer housing 15, the opening extending through the outer wall of the outer housing 15, a cylindrical seal plug 66 being inserted through the opening, and soldered to the wall surrounding the opening, to seal the opening and therefore the interior of the outer housing 15.

In order to adjust the range of acceleration of the instrument, a variable mass 68 is attached to the left-hand end of the central tube 20, as shown in FIGURE 1, thereby varying the weight of the proof mass and providing for a greater range of acceleration, without varying the thickness of the disc sections 35, 35a of the flexure springs 29, 30.

This variable mass 68 also varies the natural frequency of the spring suspension without changing the thickness of the material forming the two spring diaphragms 35, 35a, or varying the composition of the material of which the springs are made.

As shown in FIGURES 6 and 7, the outer wall of the inner housing 16, has a plurality of parallel-faced slots 70, 70a, 71, 71a, cut through each end thereof, each row of slots extending from the outer edge of the inner housing to a point close to the center of the housing, so that the housing wall is divided into a plurality of segments 72, 72a, 73, 73a. These radial segments 72, 72a and the slots through the outer wall of the inner housing allow the outer wall of the inner housing to expand when heated and contact when cooled without affecting the width of the air gap 27 between the inner edge of each stator pole 26, 26a and the outer circumference of the corresponding tubular armature pole 23, 24. With this construction, there is little or no relative movement btween the angular position of the poles of the stator 25, and the poles of the section 14, 19 of the armature. This also minimizes the stresses in the stator, due to drift.

FIGURES 8 and 9 represent schematic diagrams of a modification of the pick-off construction shown in FIGURE 1.

This construction shows a linear displacement transducer of the type shown in FIGURE 1.

The stator is a tubular member 76, similar to that shown in FIGURE 1, fitted with a total of 8 radially positioned poles, 77, 77a, as shown in FIGURE 8. While 8 poles are shown and described in FIGURE 8, the actual number of poles would be any multiple of four.

A tubular armature formed in two sections 78, 79, is mounted concentrically with the poles of the stator 76, the armature sections being supported by a central tube 93, similar to that shown in FIGURE 1.

Each section of the armature has a total of four equally spaced radially positioned poles 80, 80a, 81, 81a, the poles being radially aligned with the poles 77, 77a of the stator.

As shown in FIGURE 8, the poles 80, 80a of one section of the armature are aligned with the corresponding poles, 1, 3, 5, 7 of the stator.

Similarly the poles 81, 81a of the second section 79 of the armature are aligned with the other poles 2, 4, 6, 8, of the stator, in the normal position.

The windings 82, 83 of the stator consist of primary and secondary coils, the actual combination and arrangement of the coils, being determined by the purpose for which the transducer is used.

In the construction shown in FIGURES 8 and 9, each of the series connected primary coils 82, 82a is mounted around two adjacent stator poles, The secondary windings consist of a number of series connected secondary coils 83, 38a, each of the secondary coils being mounted around two adjacent poles 77, 77a of the stator.

The direction of current flow in the stator windings alternates in each primary coil, and also in each secondary coil.

As there is one primary coil for each pair of stator poles, and one secondary coil for each pair of stator poles, there would be a total of four primary coils, and four secondary coils in the construction shown in FIGURES 8 and 9.

The stator poles 26, 26a may be laminated, as shown in FIGURE 1, or solid.

The central tube 93, which supports the armature is supported by a pair of flexure disc springs 29, 30 similar to those shown in FIGURE 1, the flexure disc springs being adapted to restore the central tube 93 and the armature attached thereto to their initial position when the central tube is displaced longitudinally relative to the housing in which the unit is mounted. Of primary importance, is the fact that the flexure springs provide a displacement of the central tube 20, which is directly proportional to the linear acceleration along the sensitive axis.

In the neutral position shown in FIGURE 9, the line separating the two sections 78, 79 of the armature is aligned with the central plane 85 of the poles of the stator.

When the armature is displaced longitudinally relative to the stator, the area of one set of armature poles 80, relative to the stator poles 77, is varied, compared to the poles 81 of the other armature section, the reluctance of the pole 80 of one armature section and the subtended portion of the stator pole 77, varies relative to that of the poles of the second section 79 of the armature, relative to the corresponding stator poles.

These variations in reluctance and consequently indications of the longitudinal displacement of the central tube, relative to the stator are transmitted to an external point, as an indication of the extent of the displacement of the central tube, and therefore the acceleration of the instrument.

FIGURE 10 shows a modification of the magnetic damping mechanism, shown in FIGURE 1. In the modified construction, a cylindrical permanent magnet 86 is fitted to the interior of a hollow tubular return path member 87, which is made of a magnetizable material, such as soft iron, a stepped annular air gap, 88, 89, being formed between the stepped inner diameters of the return path member, and the stepped outer circumference of the stepped cylindrical permanent magnet 86. The tubular outer section 87 of the magnetic damping mechanism, may also be a permanent magnet, in the same manner as that shown in FIGURE 1. A soft iron return path cap 90 is fixedly attached to the flat outer face of the tubular return path member, the inner face of the return path cap abutting the outer surface of the cylindrical permanent magnet and being attached thereto by cementing, or other suitable attaching means.

A tubular copper ring 91 is reciprocally fitted to the narrow annular air gap 88 between the inner surface of the tubular return path member 87, and the outer surface of the enlarged section of the permanent magnet 86. The tubular copper ring 91 is supported by a bracket 92, which is attached to a integral with one end of the central tube 93, which is substantially the same as the central tube 20 shown in FIGURE 1. The tubular copper ring 91 cuts through the magnetic lines of force in the air gap 88 between the permanent magnet and the return path 87, in the same manner as that shown in FIGURE 1, thereby damping the movement of the proof mass in the same manner as that shown in FIGURE 1.

A coil 94 is inserted into the annular air gap 88, 89 between the two sections 86, 87 of the permanent magnet, and the section of the return path, in a manner similar to the construction shown in FIGURE 1.

The coil is connected to outside connections beyond the cap or return path 90 by a pair of leads 95, 96, one of which 95 extends through an area located inside one section of the air gap 89. The inner end 95a of the lead being integral with the inner end of the coil. The wire outer end 97 of the connector passes through an opening through the return path cap, the wire end 97 being connected to an external voltage source in the same manner as that shown in FIGURE 1. The wire end 97 passes through a tubular ferrule in the same manner as that shown in FIGURE 1, a glass insulator being provided to insulate the wire and the ferrule from the return path cap 90.

The second lead 96, the forward end of which is integral with the outer or right-hand end of the coil 94 is located in the upper portion of the air gap 89.

The wire or outer end 98 of the second connector 97 passes through a second opening through the return path cap 90, the wire end 98 being connected to the external voltage source in the same manner as the wire end 97 to complete the circuit to the coil 94. The wire end 98 passes through a tubular ferrule in the same manner as that shown in FIGURE 1, a glass, or other type of insulator being provided to insulate the wire from the return path cap 90.

In operation, when the outer housing 15 is accelerated, by longitudinal movement of the vehicle in which it is mounted, the outer housing is moved longitudinally relative to the proof mass or central tube 20.

This causes the poles of the armature sections to be moved longitudinally relative to the corresponding poles of the stator.

The movement of the central tube is resisted by the two flexure springs 29, 30 which tend to restore the central tube to its neutral or free position. The restoration of the central tube by means of the springs producing a displacement which is proportional to the acceleration.

This movement is further retarded to some extent by the magnetic damping mechanism, the retarding force of which is adjustable in the manner hereinbefore described.

While shown in FIGURE 1, and described in conjunction with a Linear Accelerometer, essentially the same pick-off and support mechanisms can be incorporated in and can be utilized in conjunction with any type of force responsive device or force transducer other than an accelerometer.

Figure 11:
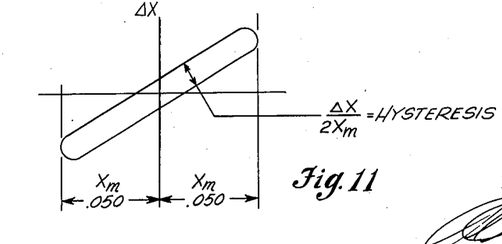
FIGURE 11 is a schematic curve showing the hysteresis of the accelerometer construction, shown in FIGURES 1 and 2.

As shown by the curves in FIGURE 11, in an accelerometer of the type shown in FIGURE 1, the maximum displacement of the spring suspended proof mass may be typically limited to .050 inch, which is indicated on the curve as $Xm$.

On comparing the performance of applicant's accelerometer to the conventional type of linear spring supported accelerometer, it has been found that in the conventional accelerometer the hysteresis of the proof mass, which is designated as $$\frac{\Delta X}{2Xm} = 0.002 \text{ or } 0.003$$

By employing the spring support means and the armature and stator support means shown in FIGURE 1, this hysteresis, which is shown diagrammatically in FIGURE 11, is reduced to 0.0002 to 0.0004.

Thus the hysteresis of the apparatus is reduced by a factor of 0.1 to 0.12.

Primarily, by employing applicant's construction, as shown in FIGURE 1, the stability of the null of the instrument, that is, the recoverable rate of the proof mass is improved considerably, regardless of the environmental temperature of the apparatus.

These improvements are caused primarily by bonding the outer circumference of the outer ring of the one piece spring to the housing and by similarly bonding the inner diameter of the inner ring of the one piece spring, and the inner diameter of the sections of the armature to the central tube.

A comparison of null stability between applicant's apparatus and the conventional type of Linear Accelerometer is shown diagrammatically in FIGURE 12.

The null position in applicant's construction is repeatable under wide temperature variations in a ratio of 1 or 2 parts in 4000.

This gives a fractional repeatability of null position of the order of 0.0005 of full scale.

The stability of the null point in the apparatus shown in the drawings is improved by the one piece spring construction and the other improvements provided by applicant in the following manner:

(a) The hysteresis of the accelerometer is reduced to a minimum. Creep in the structure is virtually eliminated.

(b) The axial motion of the proof mass and the armature, relative to the stator, under varying environmental temperatures is reduced to a minimum.

Assuming an environmental temperature range of −65° to 250° F., the relative movement of the armature relative to the stator is substantially as follows:

| $\frac{\Delta X}{Xm}$ (Prior Art.) | $\frac{\Delta X}{Xm}$ Applicant's Accel. Construction | Ambient Temperature |
|---|---|---|
| .005 | .001 | −65° F. |
| .005 | .001 | +250° F. |

Thus the improvement, over the indicated temperature range, as determined from the above data, and the diagram shown in FIGURE 12, is equal to a factor of 0.2.

Thus by providing an improved mounting for the one piece flexure springs, the stator and the armature the relative axial movement of the armature relative to the stator are reduced, the variations due to environmental temperature being reduced sharply, the indicated reduction being a factor of 0.2.

When the central tube 20, and therefore the armature 22, of the pick-off is longitudinally displaced, the poles 23, 24 of the sections of the armature are displaced relative to the poles 26, 26a of the stator. This varies the projected area of one set of poles of the armature relative to the other, thus varying the reluctance of the poles of one armature section as compared to the poles of the other armature section, in their relation to the stator poles.

These variations in reluctance, add consequently indications of the longitudinal displacement of the armature 22, are transmitted to an external point as an indication of the extent of the displacement of the central tube and therefore the longitudinal acceleration of the instrument.

It will be apparent to those skilled in the art, that the present invention is not limited to the specific details described above, and shown in the drawings nor limited to accelerometers, and that various modifications are possible in carrying out the features of the invention and the operation, actuation and the method of utilization thereof, without departing from the spirit and scope of the appended claims.

What is claimed is:

1. A linear accelerometer comprising a sealed tubular housing, a proof mass fitted to the tubular housing co-axially therewith, a plurality of spring means fixedly attached to the housing supporting the proof mass to permit longitudinal movement for the proof mass, coacting means partially supported by the tubular housing and partially fixedly attached to the proof mass, adapted to pick off as an electrical signal and transmit to an external point, the longitudinal displacement of the proof mass, initially electrically controllable permanent magnet restraining means mounted at one end of the tubular housing, and means fixedly attached to the proof mass adapted to co-act with the electrically controlled permanent magnet means to restrain the longitudinal movement of the proof mass, the permanent magnet restraining means including a permanent magnet formed in two sections, with an annular gap between the two sections of the permanent magnet, an electrically energizable coil fitted to the annular air gap between the two permanent magnet sections, means adapted to control the voltage transmitted to the electrically energizable coil, prior to normal operation of the accelerometer, the voltage transmitted through said electrically energizable coil being adapted to initially regulate the magnetic lines of force between the two sections of the permanent magnet, each spring means supporting the proof mass including a tubular outer ring, the circumferential outer surface of the tubular outer ring being fixedly attached in shear to the tubular housing, a tubular inner ring, the circumferential inner surface of which is fixedly attached in shear to the proof mass, concentrically with the outer ring, and a relatively thin spring diaphragm integral with and connecting the inner and outer rings, said spring diaphragm having a plurality of unconnected cutouts therethrough, said cutouts providing a plurality of individual spring arms connecting the inner ring with the outer ring, said spring arms allowing flexure of the spring diaphragm along the longitudinal axis of the inner and outer rings and restraining rotational angular displacement of the inner ring relative to the outer ring, the pick-off stator including a plurality of radially positioned poles, a plurality of stator coil windings surrounding pairs of poles of the stator, the armature being formed in two tubular sections, each tubular section of the armature having a plurality of radially positioned poles integral therewith, the number of poles in each tubular armature section being substantially equal to one-half the number of poles in the stator, the poles of one tubular section of the armature being rotationally angularly offset relative to the poles of the second tubular section thereof, individual poles of both sections of the tubular armature being nominally radially aligned with the corresponding poles of the stator, the stator coil windings being adapted to co-act with the poles of the armature to determine and transmit as an electrical signal the longitudinal displacement of the poles of the tubular armature sections relative to the poles of the stator.

2. A linear accelerometer comprising a sealed tubular housing, a proof mass fitted to the tubular housing co-axially therewith, multiple spring means fixedly attached to the tubular housing supporting the proof mass to permit longitudinal displacement of the proof mass, a pick-off stator fixedly attached to the tubular housing co-axially therewith, an armature fixedly attached to the proof mass adapted to co-act with the pick-off stator to transmit as an elecrical signal, the longitudinal displacement of the proof mass, relative to the tubular housing, initially electrically controllable permanent magnet restraining means mounted in one end of the tubular housing, and means attached to the proof mass adapted to co-act with the permanent magnet restraining means to restrain the longitudinal movement of the proof mass, each spring means supporting the proof mass including a tubular outer ring, the circumferential outer surface of the tubular outer ring being fixedly attached in shear to the tubular housing, a tubular inner ring, the circumferential inner surface of which is fixedly attached in shear to the proof mass, concentrically with the outer ring, and a relatively thin spring diaphragm integral with and connecting the inner and outer rings, said spring diaphragm having a plurality of unconnected cutouts therethrough, said cutouts providing a plurality of individual spring arms connecting the inner ring with the outer ring, said spring arms allowing flexure of the spring diaphragm along the longitudinal axis of the inner and outer rings and restraining rotational angular displacement of the inner ring relative to the outer ring, the pick-off stator including a plurality of radially positioned poles, a plurality of stator coil windings surrounding pairs of poles of the stator, the armature being formed in two tubular sections, each tubular section of the armature having a plurality of radially positioned poles integral therewith, the number of poles in each tubular armature section being substantially equal to one-half the number of poles in the stator, the poles of one tubular section of the armature being rotationally angularly offset relative to the poles of the second tubular section thereof, individual poles of both sections of the tubular armature being nominally radially aligned with the corresponding poles of the stator, the stator coil windings being adapted to co-act with the poles of the armature to determine and transmit as an electrical signal the longitudinal displacement of the poles of the tubular armature sections relative to the poles of the stator.

3. A linear accelerometer as in claim 2, in which the permanent magnet restraining means includes a tubular permanent magnet section fitted to the interior of the tubular housing, a substantially cylindrical permanent magnet section located within the tubular permanent magnet section, co-axially therewith, an annular air gap being formed between the two permanent magnet sections, a tubular return path section fitted to the interior of the tubular housing, located adjacent one end of the tubular permanent magnet section, and fixedly attached thereto, a cylindrical return path section located within the tubular return path section, the cylindrical return path section abutting and being fixedly attached to the cylindrical permanent magnet section, an annular air gap being formed between the tubular return path section and the cylindrical section of the return path, a conductor ring, co-axial with the housing, slidably fitted to the air gaps between the return path sections and the permanent magnet sections, means supported by the proof mass fixedly attached to the conductor ring to support the tubular conductor ring, said tubular conductor ring being adapted to cut the magnetic lines of force between the two permanent magnet sections to restrain the longitudinal movement of the tubular conductor ring, a return path cap attached to the open end of the tubular housing adjacent the end of the permanent magnet sections, opposite the end thereof abutting the two return path sections, an electrically energizable coil fitted to the annular air gap between the two permanent magnet sections, and means adapted to control the voltage transmitted to the electrically energizable coil, prior to normal operation of the accelerometer, said electrically energizable coil being adapted to initially regulate the magnetic lines of force between the two sections of the permanent magnet.

4. A linear accelerometer, as in claim 2, in which the permanent magnet restraining means includes a tubular permanent magnet section fitted to the interior of the tubular housing, a substantially cylindrical permanent magnet section located within the tubular permanent magnet section, co-axially therewith, an annular air gap being formed between the two permanent magnet sections, a tubular return path section fitted to the interior of the tubular housing, abutting one end of the tubular permanent magnet section, and fixedly attached thereto, a cylindrical return path section located within the tubular return path section, the cylindrical return path section abutting and being fixedly attached to the cylindrical permanent magnet section, an annular air gap being formed between the tubular return path section and the cylindrical section of the return path, a tubular conductor ring, co-axial with the tubular housing, slidably fitted to the annular air gaps between the return path sections and the sections of the permanent magnet, bracket means fixedly attaching the conductor ring to the proof mass to support the tubular conductor ring, said tubular conductor ring being adapted to cut through the magnetic lines of force between the two sections of the permanent magnet to restrain the longitudinal movement of the tubular conductor ring, a return path cap attached to the open end of the tubular housing, adjacent to the end of the permanent magnet sections, opposite the end thereof abutting the two return path sections, an electrically energizable coil fitted to the annular air gap between the two sections of the permanent magnet, a lead fitted to a portion of the air gap between the two sections of the permanent magnet integral with one end of the coil, the end of said lead opposite the end integral with the coil, passing through the return path cap, a second lead fitted to another portion of the air gap between the two sections of the permanent magnet, said second lead being integral with the end of the coil located near the return path cap, the end of the second lead, opposite the end integral with the coil, passing through the return path cap, said leads being adapted to initially transmit varying voltage to the coil, thereby to regulate the magnetic lines of force between the two sections of the permanent magnet, after assembly of the permanent magnet restraining means to the tubular housing, and prior to the operation of the unit as an accelerometer.

5. A linear force transducer comprising a tubular housing, a combination seal cap and return path heat sealed to one end of said tubular housing, a combination seal cap and connector plate heat sealed to the end of the tubular housing opposite the combination return path and seal cap to seal the interior of the tubular housing, a tubular proof mass fitted to the tubular housing co-axially therewith, multiple flexure spring means fixedly attached to the tubular housing supporting the tubular proof mass to permit longitudial displacement of the tubular proof mass, a pick-off stator fixedly attached to the tubular housing co-axially therewith, a tubular armature surrounding the tubular proof mass, the circumferential inner surface of the armature being fixedly attached in shear to the tubular proof mass, said tubular armature being adapted to co-act with the pick off stator to transmit, as an electrical signal to an external point, the longitudinal displacement of the tubular proof mass, initially electrically controllable permanent magnet restraining means mounted within the tubular housing adjacent the combination seal cap and return path, and means attached to the tubular proof mass adapted to co-act with the electrically controllable permanent magnet means, to restrain the longitudinal movement of the proof mass, the permanent magnet restraining means including a permanent magnet formed in two sections, with an annular gap between the two sections of the permanent magnet, an electrically energizable coil fitted to the annular gap between the two permanent magnet sections, means adapted to control voltage transmitted to the electrically energizable coil prior to normal operation of the accelerometer, the voltage transmitted through the electrically energizable coil being adapted to initially regulate the magnetic lines of force between the two sections of the permanent magnet, the interior of the tubular housing being filled with an inert gas, the tubular housing having an opening therethrough to permit the inert gas to be injected into the tubular housing, and a seal plug inserted in and fixedly attached to said opening to seal the interior of the tubular housing, each flexure spring means supporting the tubular proof mass including a tubular outer ring, the circumferential outer surface of which is fixedly attached in shear to the tubular housing, a tubular inner ring, the circumferential inner surface of which is fixedly attached in shear, to one end of the tubular proof mass, and a relatively thin spring diaphragm integral with the inner and outer rings and extending therebetween, said inner and outer rings being substantially co-axial with the tubular housing, a variable mass attached to one end of the tubular proof mass to vary the weight of the tubular proof mass, and therefore the range of acceleration measurable by the accelerometer, and a magnetic shield fitted to the tubular housing, between one of the flexure springs and the permanent magnet means, said magnetic shield including a circular disc extending from the proof mass to the interior of the housing, said magnetic shield being operative to restrict the flow of magnetic lines of force from the permanent magnet means to the pick-off stator, and the armature used in conjunction therewith.

6. A linear force transducer, as in claim 5, in which the perament magnet restraining means includes a tubular permanent magnet section fitted to the interior of the tubular housing, a substantially cylindrical permanent magnet section located within the tubular permanent magnet section, co-axially therewith, a tubular return path section fitted to the interior of the tubular housing, adjacent one end of the tubular permanent magnet section and fixedly attached thereto, a cylindrical return path section located within the tubular return path section, the cylindrical return path section abutting and being fixedly attached to the cylindrical permanent magnet section, an annular air gap being formed between the tubular return path section and the cylindrical section of the return path, a tubular conductor ring co-axial with the outer housing slidably fitted to the annular air gaps between the return path sections and the permanent magnet sections, means supported by the tubular proof mass fixedly attached to the tubular conductor ring to support the tubular conductor ring, said tubular conductor ring being adapted to cut the magnetic lines of force between the two return path sections and the two permanent magnet sections to restrain the longitudinal movement of the tubular conductor ring, the outer end of the tubular permanent magnet section and the cylindrical permanent magnet section being fixedly attached to the combination seal cap and return path, a magnetic shield fitted to the inner housing between one flexure spring means and the tubular conductor ring, to prevent the flow of magnetic lines of force from the permanent magnet sictions to the tubular armature attached to the tubular proof mass, said magnetic shield including a circular disc extending from the proof mass to the interior of the housing, said magnetic shield being operative to restrict the flow of magnetic lines of force from the permanent magnet means to the pick-off stator, and the armature used in conjunction therewith.

7. A linear force transducer, as in claim 5, in which said spring diaphragm has a plurality of unconnected cutouts therethrough, said cutouts providing a plurality of individual spring arms connecting the tubular inner ring with the tubular outer ring, said spring arms allowing flexure of the spring diaphragm along the longitudinal axis of the tubular inner and outer rings, and restraining rotational angular displacement of the tubular inner ring relative to the tubular outer ring.

8. A linear force transducer, as in claim 5, in which said spring diaphragm has a plurality of unconnected cutouts therethrough, said cutouts providing a plurality of individual spring arms connecting the tubular inner ring with the tubular outer ring, said spring arms allowing flexure of the spring diaphragm along the longitudinal axis of the tubular inner and outer rings, while restraining rotational angular displacement of the tubular inner ring relative to the tubular outer ring, and a variable auxiliary mass attached to one end of the tubular proof mass to vary the weight of the tubular proof mass.

9. A linear force transducer, as in claim 5, in which a tubular inner housing concentric with the tubular housing, is fitted to the interior of the tubular housing, the circumferential outer wall of the tubular inner housing having a first group consisting of a plurality of equally-spaced radially positioned parallel-faced slots therethrough each of said slots extending from one longitudinal edge of the tubular inner housing to a point adjacent the longitudinal center of the tubular inner housing, and a second group consisting of a plurality of equally-spaced radially positioned slots, each of said second group of slots extending from the longitudinal edge of the tubular inner housing, opposite the longitudinal edge through which the first group of slots are cut, to a point adjacent the longitudinal center of the tubular inner housing, said second group of slots being radially angularly displaced relative to the first group of slots, said slots providing increased flexibility to the outer wall of the tubular inner housing, and allowing the circumferential length of the outer wall of the tubular inner housing to be varied, due to temperature variations, without affecting the outer diameter of the tubular inner housing.

References Cited in the file of this patent

UNITED STATES PATENTS

| | | |
|---|---|---|
| 2,767,973 | Veen | Oct. 23, 1956 |
| 2,768,359 | Side | Oct. 23, 1956 |
| 2,870,422 | Gindes | Jan. 20, 1959 |
| 2,885,644 | Grant | May 5, 1959 |
| 2,888,256 | Sedgfield | May 26, 1959 |
| 2,923,904 | Hieber | Feb. 2, 1960 |
| 2,978,910 | Aske | Apr. 11, 1961 |
| 2,991,438 | Dove | July 4, 1961 |